US011480806B2

(12) United States Patent
Hein et al.

(10) Patent No.: US 11,480,806 B2
(45) Date of Patent: Oct. 25, 2022

(54) CASSEGRAIN TELESCOPE WITH A SEGMENTED FOCAL PLANE

(71) Applicants: THALES, Courbevoie (FR); UNIVERSITE D'AIX-MARSEILLE, Marseilles (FR); CENTRE NATIONAL DE LA RECHERCHE SCIENTIFIQUE, Paris (FR)

(72) Inventors: Grégoire Hein, Marseilles (FR); Marc Ferrari, Marseilles (FR); Nicolas Tetaz, Cannes la Bocca (FR); Wilfried Jahn, Marseilles (FR); Emmanuel Hugot, Marseilles (FR)

(73) Assignees: THALES, Courbevoie (FR); UNIVERSITE D'AIX-MARSEILLE, Marseilles (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 166 days.

(21) Appl. No.: 17/034,398

(22) Filed: Sep. 28, 2020

(65) Prior Publication Data

US 2021/0096383 A1 Apr. 1, 2021

(30) Foreign Application Priority Data

Sep. 26, 2019 (FR) ...................... 1910625

(51) Int. Cl.
*G02B 17/06* (2006.01)
*G02B 23/02* (2006.01)
(Continued)

(52) U.S. Cl.
CPC ....... *G02B 27/1066* (2013.01); *G02B 17/061* (2013.01); *G02B 17/0615* (2013.01);
(Continued)

(58) Field of Classification Search
None
See application file for complete search history.

(56) References Cited

U.S. PATENT DOCUMENTS

2010/0202073 A1 8/2010 Cook
2018/0164573 A1 6/2018 Tetaz

OTHER PUBLICATIONS

Dolkens, et al., "Design and end-to-end modelling of a deployable telescope", Proceedings of SPIE, vol. 10562, p. 1056227, Sep. 25, 2017.
(Continued)

*Primary Examiner* — Derek S. Chapel
(74) *Attorney, Agent, or Firm* — BakerHostetler

(57) ABSTRACT

A telescope includes an initial telescope comprising a concave first mirror and a convex second mirror that are configured so that they form, from a light beam coming from infinity, an image called the intermediate image in a focal plane called the intermediate focal plane, the intermediate image having a largest dimension along an X-axis perpendicular to an optical axis of the telescope, a segmenting module comprising a first set of n segmenting mirrors that are placed downstream of the intermediate focal plane and that are configured to divide the intermediate image obtained from the intermediate focal plane into n sub-images, a second set of n refocusing mirrors that are configured to reimage the n sub-images into n images in a focal plane of the telescope, the images being arranged in the focal plane so as to decrease the dimension along X containing the n images, a detecting device placed in the focal plane.

5 Claims, 14 Drawing Sheets

(51) Int. Cl.
*G02B 23/06* (2006.01)
*G02B 27/10* (2006.01)
*G02B 27/00* (2006.01)

(52) U.S. Cl.
CPC ..... *G02B 17/0663* (2013.01); *G02B 17/0694* (2013.01); *G02B 23/02* (2013.01); *G02B 27/0025* (2013.01); *G02B 23/06* (2013.01); *G02B 27/0012* (2013.01)

(56) References Cited

OTHER PUBLICATIONS

Jahn, et al., "Innovative focal plane design for large space telescope using freeform mirrors", Optica, vol. 4, Issue 10, pp. 1188-1195, (2017).

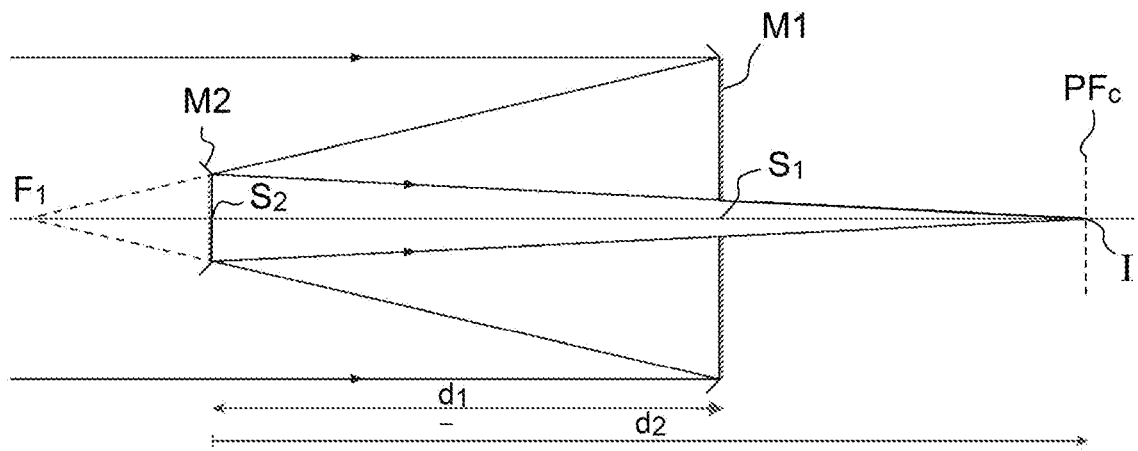
FIG.11
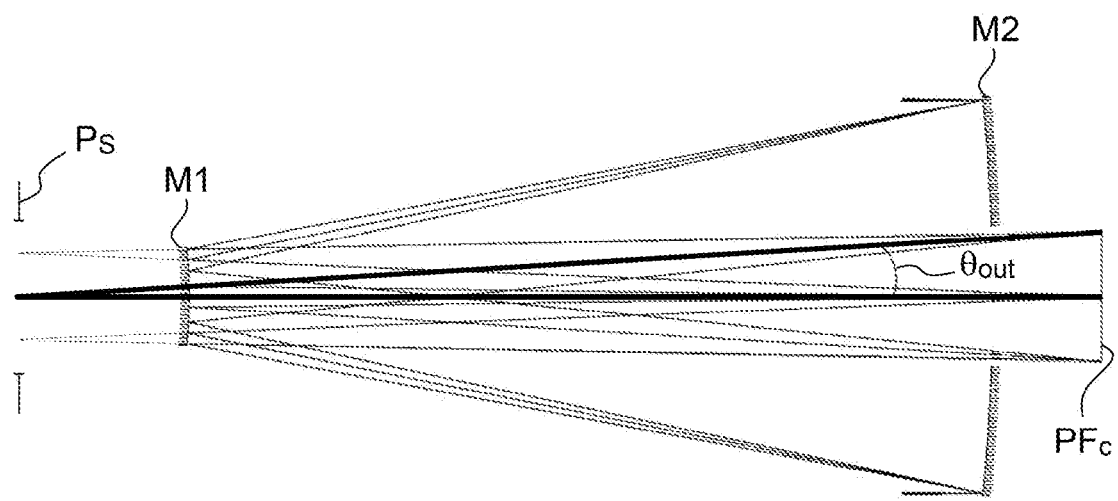
FIG.11bis

US 11,480,806 B2

CASSEGRAIN TELESCOPE WITH A SEGMENTED FOCAL PLANE

CROSS-REFERENCE TO RELATED APPLICATIONS

This application claims priority to foreign French patent application No. FR 1910625, filed on Sep. 26, 2019, the disclosure of which is incorporated by reference in its entirety.

FIELD OF THE INVENTION

The field of the invention is that of telescopes, and in particular that of observation telescopes on board satellites. More precisely, the field of the invention relates to high-resolution, large-field catoptric systems.

BACKGROUND

Historically, the first telescopes were (lens-based) refractor telescopes. Subsequently, the first catadioptric telescopes were Newton telescopes (a single mirror), two-mirror telescopes of Cassegrain/Ritchey-Chrétien type arriving later. These telescopes comprise two mirrors (a concave first mirror M1 and a convex second mirror M2) that are configured to form an image of a light beam F0 coming from infinity in a focal plane PFc in which a detector is placed, such as illustrated in FIG. 1.

This optical system has, as is well known to those skilled in the art, an optical axis O that is defined by the ray passing through the centre of the entrance pupil $P_E$ and perpendicular to this pupil.

The various elements (mirrors M1, M2 and detector) of the telescope are arranged in an order and with positions and optical characteristics that define the optic design of the telescope. The telescope has an entrance pupil PE and an exit pupil, these notions being well known to those skilled in the art. The entrance pupil of this telescope consists of the diameter of M1.

As known, a telescope is characterized by the following parameters:
- a focal length f,
- an aperture: ratio of the focal length f to the diameter D of M1 (expressed in terms of f/integer number),
- a field of view, which is the solid angle observed by the instrument for an image having an image quality judged acceptable.

The quality of an optical system may be evaluated by comparing an ideal diffraction-limited light wave and the actual light wave output from the optical system i.e. affected by defects in the optical system passed through. Analysis of the difference between the theoretical wave and the actual wave allows the types of defects or aberrations in the optical system to be identified. It is known that the main types of geometrical aberration are: spherical aberration, astigmatism, coma, field curvature (defocus in the field) and distortion (3rd-order aberrations).

The mirrors M1 and M2 are parabolic-hyperbolic for a Cassegrain telescope and hyperbolic-hyperbolic for an RC telescope, and the optical design of this type of telescope is determined, as known, depending on the various aforementioned parameters and, for example, on the distance d1 between M1 and M2, or the distance d2 between M2 and the desired focal plane PF.

The fact of having two mirrors in the optical design allows two of the three types of 3rd-order aberrations to be corrected: either spherical aberration and coma are corrected (Ritchey-Chrétien telescope) or spherical aberration and astigmatism are corrected (Cassegrain telescope). This type of telescope will be called an RC/C telescope below. In contrast, this type of telescope still exhibits field curvature (Petzval curvature) and distortion, this limiting the field of view in which image quality is sufficient to values lower than 0.5°. Thus, a Ritchey-Chrétien telescope generally has a linear field smaller than 0.8°. It is the non-correction of the aforementioned aberrations that causes the field of view to be limited.

Moreover, other types of 2-mirror telescopes do exist, such as the Schmidt-Maksutov telescope, the Gregorian telescope, the Schwarzschild telescope, inter alia.

Because of the aforementioned limitations, 2-mirror telescopes (whether of RC/C or any other design), although very compact, are no longer currently used for high-resolution (long-focal-length), large-field imaging. For 20 years now, the standard for long-focal-length space telescopes has been the Korsch telescope (such as illustrated in FIG. 2), which allows a field larger than that of a Ritchey-Chrétien telescope to be obtained.

The Korsch telescope, also referred to as a three-mirror anastigmat (TMA), is a type of anastigmatic telescope comprising (in concave-convex-concave order) three aspherical mirrors i.e. a concave first mirror M1k, a convex second mirror M2k and a concave third mirror M3k. The three mirrors M1k, M2k and M3k are arranged so that the first mirror M1k and the second mirror M2k form from an object at infinity an intermediate image $P_{FIk}$ that is located between M2k and M3k, this third mirror forming from this intermediate image a final image in the focal plane PFk of the telescope, in which the detector D is placed.

At least one steering mirror MR allows the system to be made more compact. This telescope has an exit pupil PS placed between M3 and D.

The three mirrors allows all of the 3rd-order aberrations plus field curvature to be corrected. There are a sufficient number of degrees of freedom in its optical design to correct field curvature (application of the Korsch equations, which are well known to those skilled in the art), and therefore its field of view is larger than in RC/C telescopes. The theoretical solution is of very high quality, this being the key benefit of this type of telescope. Typically, Korsch telescopes have a field of view comprised between 0 and 3°, and focal lengths of several meters—typically 3m to 40 m.

For observation of the Earth, these telescopes operate according to the "push broom" principle: an image is formed on a detector consisting of a linear array, the rotation of the satellite around the Earth naturally causing the image to be scanned.

The resolution and field of telescopes for observing planets are being required to increase at great rate, as dictated not only by military requirements (reconnaissance, identification) but also by civil requirements (crop management, forest management, construction and building projects, natural disasters, etc.). This increase in resolution and field has led to linear focal planes that are increasingly bulky and difficult to integrate being required.

Example: Mission at 700 km altitude for a ground sampling distance (GSD) of 30 cm, a swath of 30 km and pixels of 10 μm. The focal plane will thus be 1 m wide, this being big in terms of complexity and integration of the focal plane.

It therefore becomes necessary to decrease the linear size of this focal plane in order to remedy the aforementioned problems.

A solution using a segmenting module associated with a Korsch telescope (referred to as the segmented Korsch telescope) is described in the publication "Innovative focal plane design for large space telescope using freeform mirrors" by Jahn et al, Optica, Vol. 4, Issue 10, pp. 1188-1195, (2017) such as illustrated in FIG. 3. A segmenting module 5 is placed after the focal plane PFk of the initial telescope (M1k, M2k, M3k) in order to first divide it into smaller sub-images. Such a division into sub-images is conventional in Earth-observation optics. The telescope also comprises a deformable mirror MD placed in the exit pupil of the initial Korsch telescope in order to improve the image quality thereof. Innovatively, in the Jahn publication, these sub-images are then reimaged and rearranged one under another on a detector Det (single detector, superposed strips, mosaic of elementary detectors, etc.) decreasing the linear size of the focal plane by a factor substantially equal to the number of sub-images. Thus, the focal plane of the initial telescope becomes an intermediate image and the final focal plane PFkf of the telescope is reduced to a much smaller single detector. The module 5 here performs a dual function: segmentation into sub-images and rearrangement of these sub-images in the plane of the detector.

The segmenting module 5 comprises a set of segmenting mirrors ms1, which set is placed downstream of the focal plane PFk of the initial telescope, in order to form the sub-images by dividing the total field into a plurality of sub-fields, and comprises a set of refocusing mirrors ms2 in order to form the final images in the focal plane PFkf, such as illustrated in FIG. 4. The mirrors ms1 and ms2 are freeform mirrors. Instead of the linear (along X) detector DL positioned in the initial focal plane PFk used in a conventional Korsch telescope, with a segmented Korsch telescope a detector Det the dimension along X of which is decreased is used, such as illustrated in FIG. 5 for the case where 7 initial images aligned along X in the focal plane PFk are reimaged so as to be superposed on one another in the final focal plane PFkf.

The segmented Korsch telescope uses a detector of decreased dimension but in fact has a lower image quality than a conventional Korsch telescope in terms of resolution, image quality and field size (see below). Furthermore, such a telescope has a very high cost and bulk.

SUMMARY OF THE INVENTION

One aim of the present invention is to remedy the aforementioned drawbacks by providing a segmented telescope that is both more compact and that has an improved image quality with respect to the segmented Korsch telescope.

The subject of the present invention is a telescope comprising:

an initial telescope comprising a concave first mirror and a convex second mirror that are configured so that they form, from a light beam coming from infinity, an image called the intermediate image in a focal plane called the intermediate focal plane, said intermediate image having a largest dimension along an X-axis perpendicular to an optical axis of the telescope, a segmenting module comprising:

a first set of n segmenting mirrors that are placed downstream of the intermediate focal plane and that are configured to divide the intermediate image obtained from the intermediate focal plane into n sub-images, a second set of n refocusing mirrors that are configured to reimage said n sub-images into n images in a focal plane of the telescope, said images being arranged in said focal plane so as to decrease the dimension along X containing the n images, a detecting device placed in said focal plane.

Preferably the initial telescope is of Ritchey-Chrétien or Cassegrain type.

According to one variant, the mirrors of the first set are placed in the same plane P1 perpendicular to said optical axis.

According to one embodiment, a distance between the intermediate focal plane and the plane P1 is comprised in a range [dseg−20%, dseg+20%] with dseg a distance determined at least depending on a focal length of the initial telescope and on a magnification of the segmenting module, using a preset relationship taking the form of a polynomial interpolation of degree 2 of type:

$$dseg = A + B^*fc + C^*gs + D^*fc^2 + E^*fc^*gs + F^*gs^2$$

the coefficients A to F being determined depending on an entrance field along the X-axis.

According to another variant, the mirrors of the first set and the mirrors of the second set are placed in at least two different planes perpendicular to the optical axis, a channel comprising a segmenting mirror and an associated focusing mirror, a channel having an associated focal length, all the channels being configured to form said images in said focal plane.

The following description gives a number of exemplary embodiments of the device of the invention: these examples do not limit the scope of the invention. These exemplary embodiments not only have features that are essential to the invention but also additional features specific to the embodiments in question.

BRIEF DESCRIPTION OF THE DRAWINGS

The invention will be better understood and other features, aims and advantages thereof will become apparent from the detailed description which follows and with reference to the appended drawings, which are given by way of non-limiting example and in which:

FIG. 11 illustrates the distances and optical parameters of interest in a
Cassegrain/Ritchey-Chrétien telescope.

FIG. 11bis illustrates the chief field-edge ray and the angle along X that it makes with the optical axis of the system.

DETAILED DESCRIPTION

The invention consists in associating a 2-mirror telescope (initial telescope) and a segmenting module such as initially produced for the Korsch telescope. Any type of 2-mirror telescope operating in infinite/focal mode is useable for the invention. Preferably, the initial telescope is an RC/C telescope such as described above, because this type of telescope is a catadioptric telescope.

Figure 1:
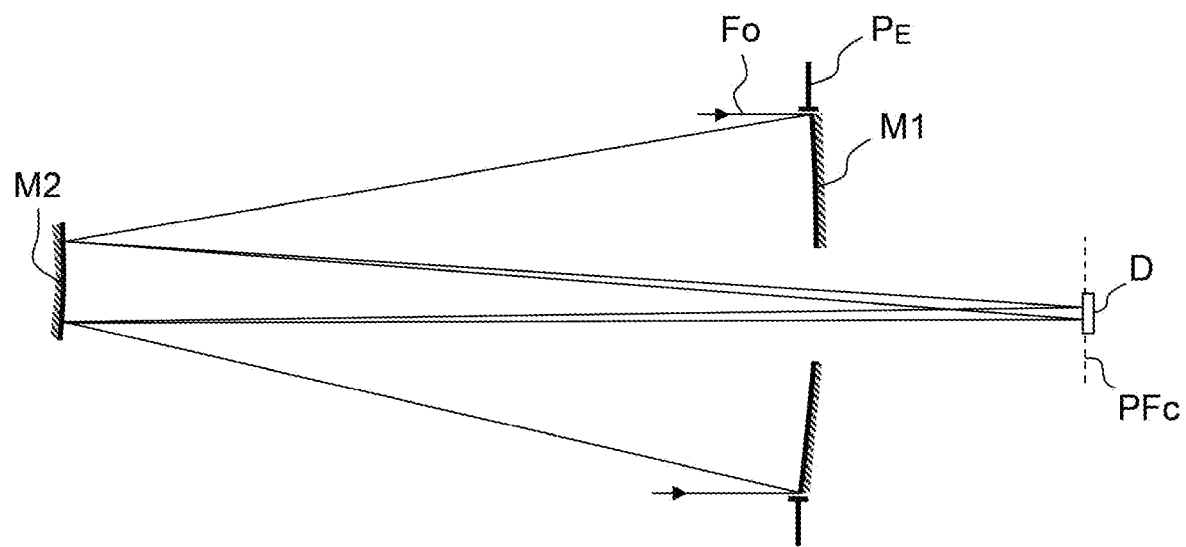
FIG. 1, which has already been cited, illustrates a Cassegrain/Ritchey-Chrétien telescope according to the prior art.
Figure 2:
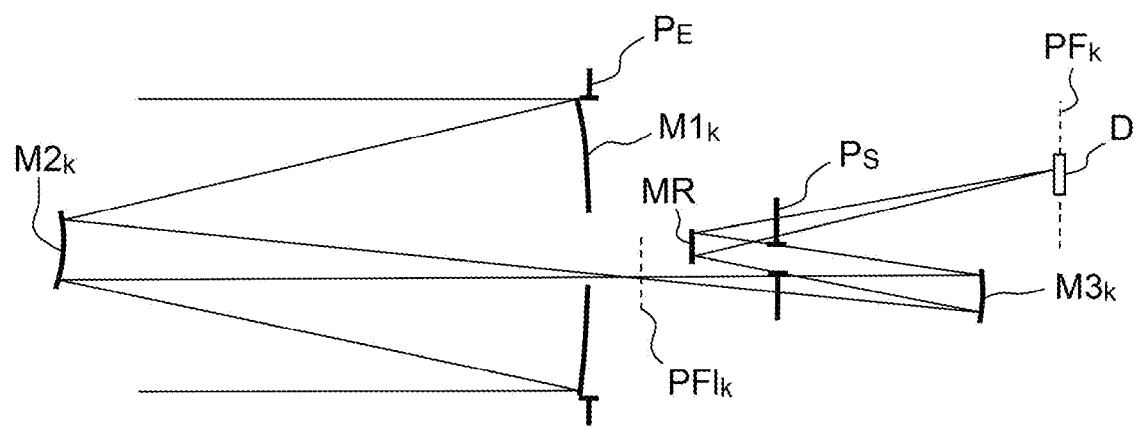
FIG. 2, which has already been cited, illustrates a Korsch telescope according to the prior art.
Figure 3:
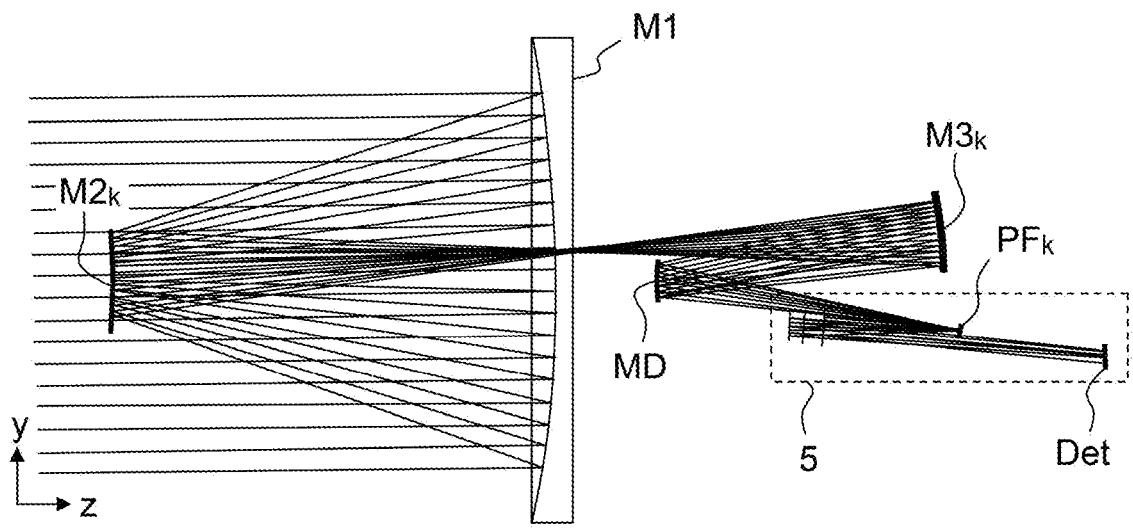
FIG. 3 illustrates the principle of a segmented Korsch telescope according to the prior art.
Figure 4:
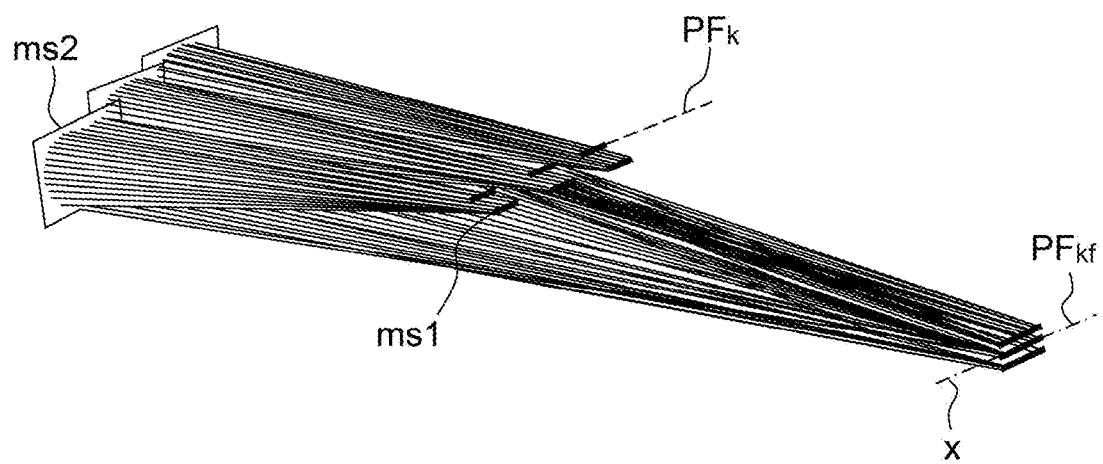
FIG. 4, which has already been cited, more particularly illustrates the segmenting module of the segmented Korsch telescope of FIG. 3.
Figure 5:
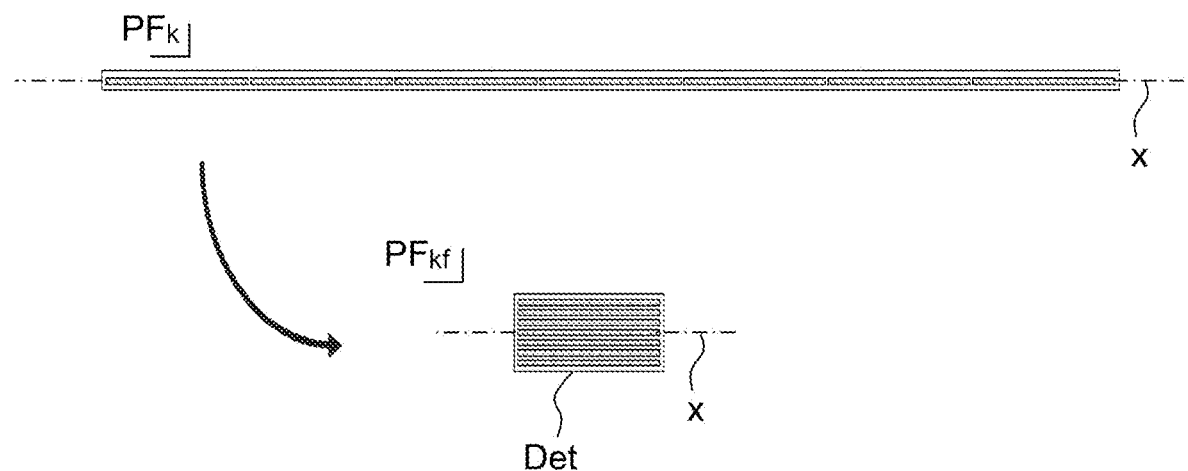
FIG. 5, which has already been cited, illustrates the focal plane of a conventional push-broom telescope and of a segmented push-broom telescope.
Figure 6:
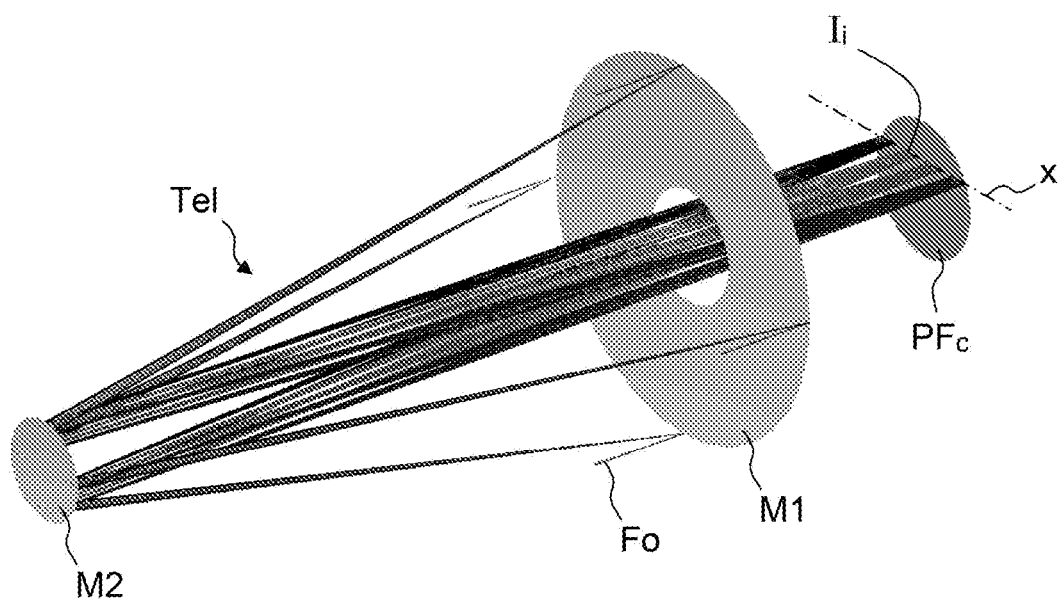
FIG. 6 illustrates a Cassegrain/Ritchey-Chrétien telescope used in a push-broom application with a "useful" focal plane along an X-axis.

FIG. 6 illustrates a perspective view of the initial two-mirror telescope Tel used in push-broom mode with a focal plane PFc in which an image Ii of infinity is formed along an X-axis perpendicular to the optical axis of the system (XY focal plane perpendicular to the optical axis). The image Ii used in push-broom mode has a dimension along X (linear dimension) very much larger than its dimension along Y. Specifically, in push-broom mode, only that portion of the field with is located in the vicinity of the X-axis is of interest, information along Y being obtained by scanning, and it is the detectors, placed solely in this location, that define the image Ii contained in the focal plane PFc.

Figure 7:
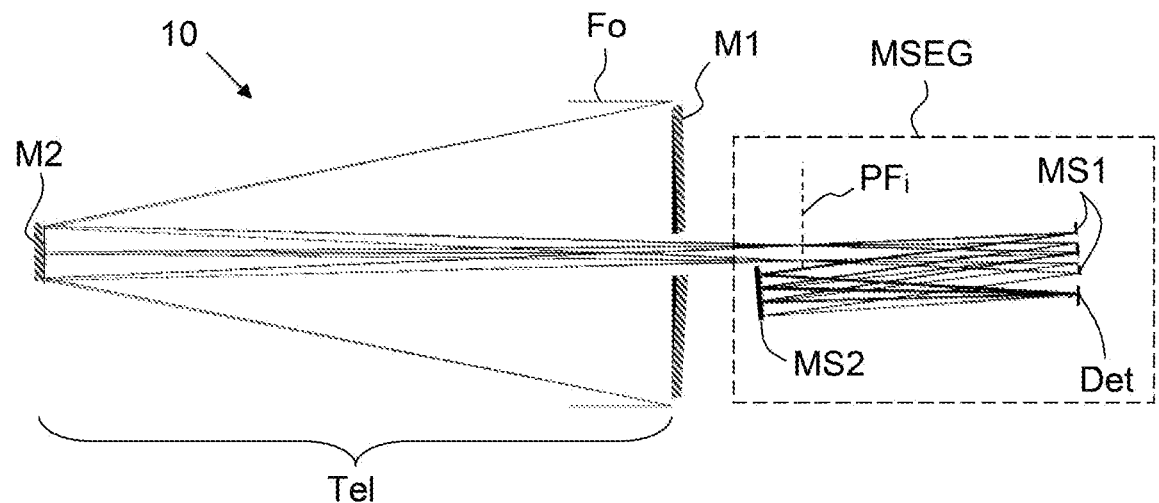
FIG. 7 illustrates a profile view of a telescope according to the invention.
Figure 8:
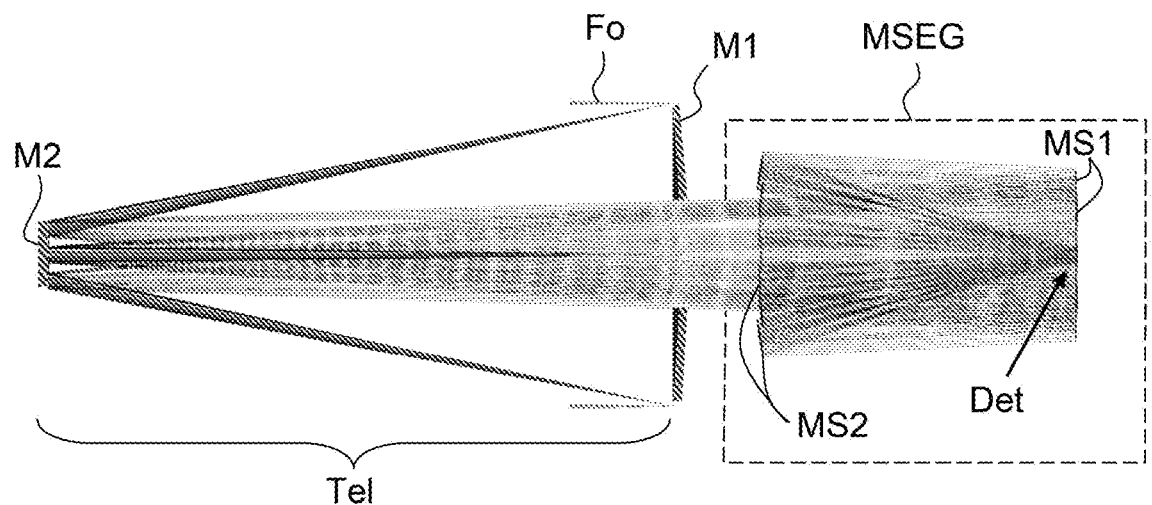
FIG. 8 illustrates a view from above of a telescope according to the invention.

FIG. 7 illustrates a telescope 10 according to the invention seen in profile and FIG. 8 illustrates the telescope 10 according to the invention seen from above. The telescope 10 according to the invention comprises an initial 2-mirror telescope Tel, which is preferably of Ritchey-Chrétien or Cassegrain type, comprising a concave first mirror M1 and a convex second mirror M2 that are configured so that they form, from a light beam F0 coming from infinity, an image called the intermediate image Ii in a focal plane called the intermediate focal plane PFi, the intermediate image having its largest dimension along the X-axis perpendicular to the optical axis of the telescope (in comparison to the dimension along the Y-axis perpendicular to X). By largest dimension along X, what is meant is the fact that, in the overall image formed by the telescope Tel in the intermediate focal plane PFi, only the portion in the vicinity of the X-axis is of interest and defines the intermediate image Ii.

The telescope 10 according to the invention also comprises a segmenting module MSEG.

The module MSEG comprises a first set of n segmenting mirrors MS1 that are placed downstream of the intermediate focal plane and that are configured to divide the intermediate image obtained from the intermediate focal plane into n sub-images. These mirrors MS1 solely sample the segment of field that would have been detected by the detectors of the telescope Tel if they existed.

The module MSEG also comprises a second set of n refocusing mirrors MS2 that are configured to reimage said n sub-images into n images in a focal plane PF of the telescope, said images being arranged in said focal plane PF so as to decrease the dimension along the X-axis containing the n images. The n images are for example exactly superposed one below another, but may also be offset.

Lastly, the segmenting module comprises a detecting device Det placed in the focal plane PF. By detecting device, what is meant is a detector in the broad sense, i.e. possibly a matrix-array and/or a detector composed of a superposition of strips and/or a mosaic of elementary detectors for example.

Figure 9:
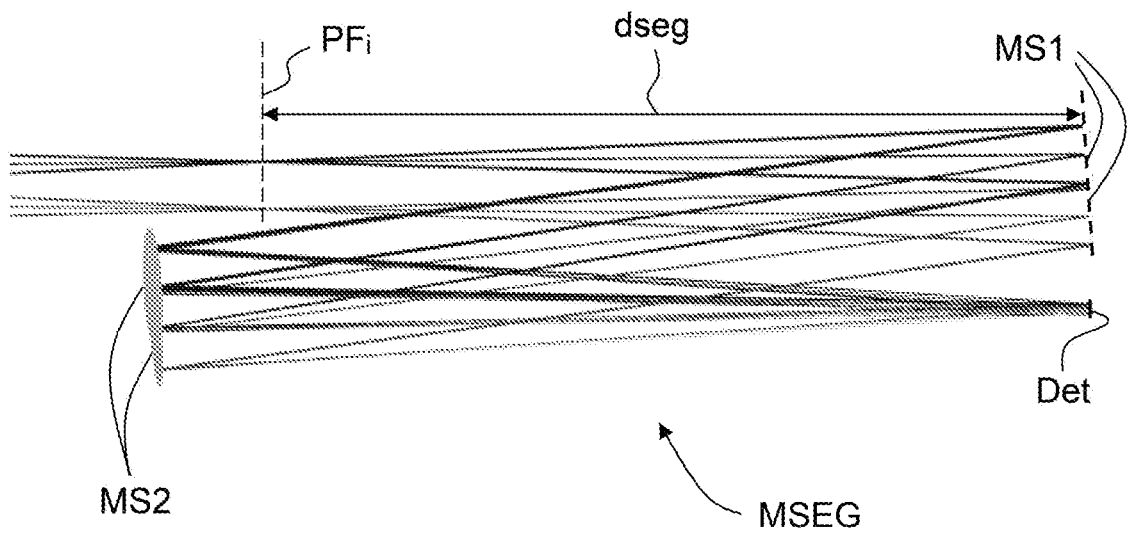
FIG. 9 more particularly illustrates a profile view of the segmenting module of the telescope according to the invention.
Figure 10:
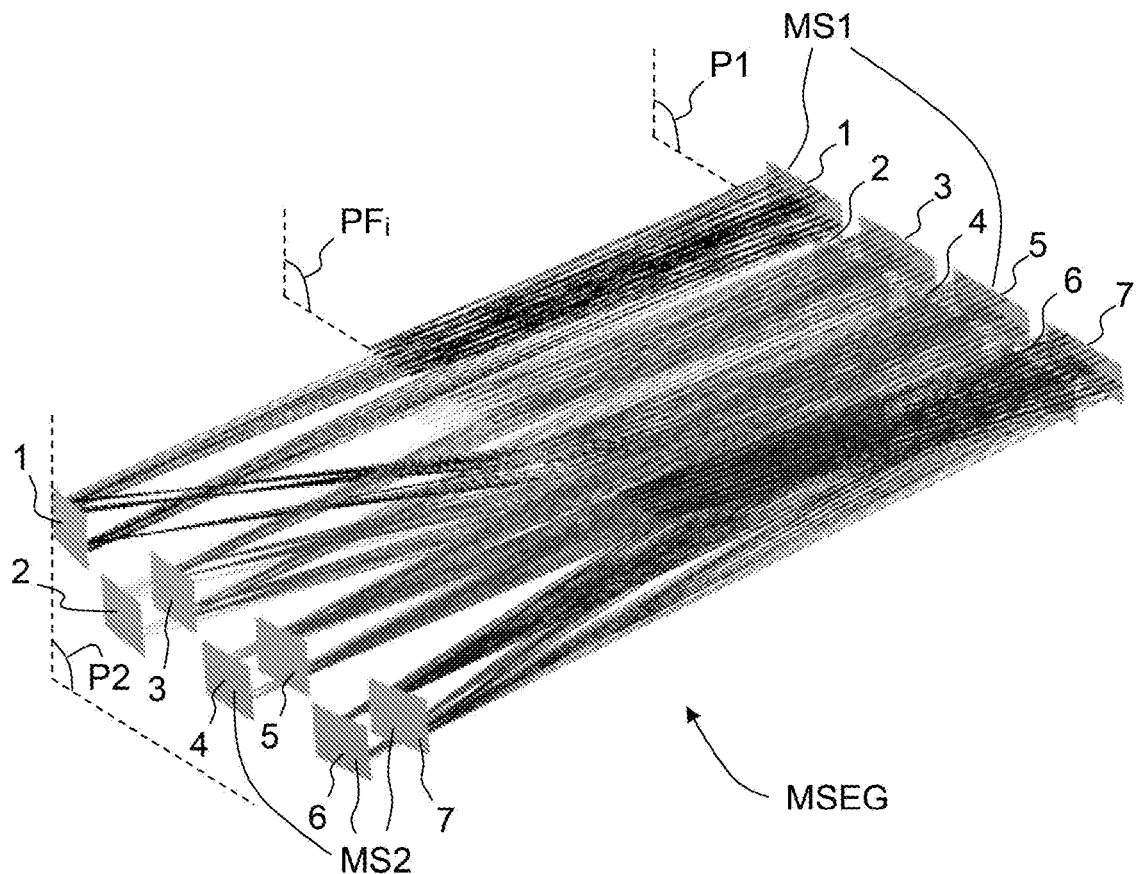
FIG. 10 illustrates a perspective view of an example of a segmenting module of the telescope according to the invention.

FIGS. 9 and 10 show the segmenting module seen in profile and in perspective, respectively, for an example with n=7 and according to a first variant of the invention, in which variant the mirrors MS1 are all located in the same plane P1 and the mirrors MS2 are also all located in the same plane P2. The focal length of the telescope is identical for all points in the field of view. In this variant, the segmenting module is of the same type as that described in the aforementioned publication by Jahn et al. The segmenting mirrors MS1 are numbered from 1 to 7, and the segmenting mirror MS2 associated with each of the mirrors MS1 has been given an identical reference number. The chosen example is of 7 channels (a channel corresponds to the association of a segmenting mirror and of the associated refocusing mirror), and each channel is represented by a different shade of grey in FIG. 10. With n channels, the linear size of the focal plane is decreased by a factor n, here 7, but other mission parameters may lead to a different number of channels being chosen. Likewise, the arrangement in space of the set of mirrors MS1 and MS2 was chosen as such for reasons of bulk and of image quality, but many other different arrangements are possible.

The detecting device Det is illustrated positioned in the same plane arbitrarily.

The combination of a 2-mirror telescope, which is of much lower performance than a Korsch telescope, with a segmenting module, is not obvious—it is even counter-intuitive. Specifically, since the telescope and the segmenting module are optimized independently, the image quality obtained with a segmented Korsch telescope is expected to be much better than that of a segmented RC/C. However, the inventors have observed that such is not the case, and that the segmented RC/C is able to deliver a higher image quality than a segmented Korsch telescope of identical aperture and focal length. Moreover, the segmented RC/C telescope has a field of view larger than the field of view of a conventional RC/C telescope.

After many studies and trials, the inventors have identified the origin of this counter-intuitive result.

To demonstrate this origin, a particular aspect of a Cassegrain telescope and of a Korsch telescope was compared. The focal length fc, and the aperture, the field and the distance M2-PFc(M2-PFik for the Korsch telescope) were set equal to fc/5 for both telescopes. The variable distance d1 between M1 and M2 was left free, in order to allow each design to be optimized.

FIG. 11 illustrates the various distances and points of interest in a Cassegrain telescope: the point I is the point in the image/focal plane PFc located on the optical axis, d1 is the distance between M1 and M2, d2 is the distance between M2 and I, and $d_{EPC}$ is the distance between the exit pupil PS and the point I. The point F1 is the focal point of the primary mirror M1, and the points S1, S2 are the apexes of the mirrors M1, M2.

The parameters of the Cassegrain telescope are given by:

$$R_1 = \frac{2d_1 f_c}{f_c - d_2} \quad R_2 = \frac{2d_1 d_2}{d_1 - d_2 + f_c} \quad d_{EPC} = d_2 - \frac{R_2 d_1}{R_2 + 2d_1}$$

R1 and R2, the radii of curvature of the mirrors M1 and M2.

If the focal length fc is set to 10 m, the distance d2 is for example set to fc/5 and the diameter D of M1 is set to D=0.8 m, the only system variable is the distance d1. Moreover, the aperture N=fc/D is equal to 12.5.

θout is defined as the exit angle of the chief field-edge ray of the initial telescope Tel. A chief ray is a ray that passes through the centre of the exit pupil. The chief field-edge ray is the ray that passes through the centre of PS and that is incident on the image/focal plane at the edge of the field (edge of the detector in a conventional telescope). FIG. 11bis illustrates this ray for a 2-mirror telescope in which the virtual exit pupil is placed behind M2.

Figure 13:
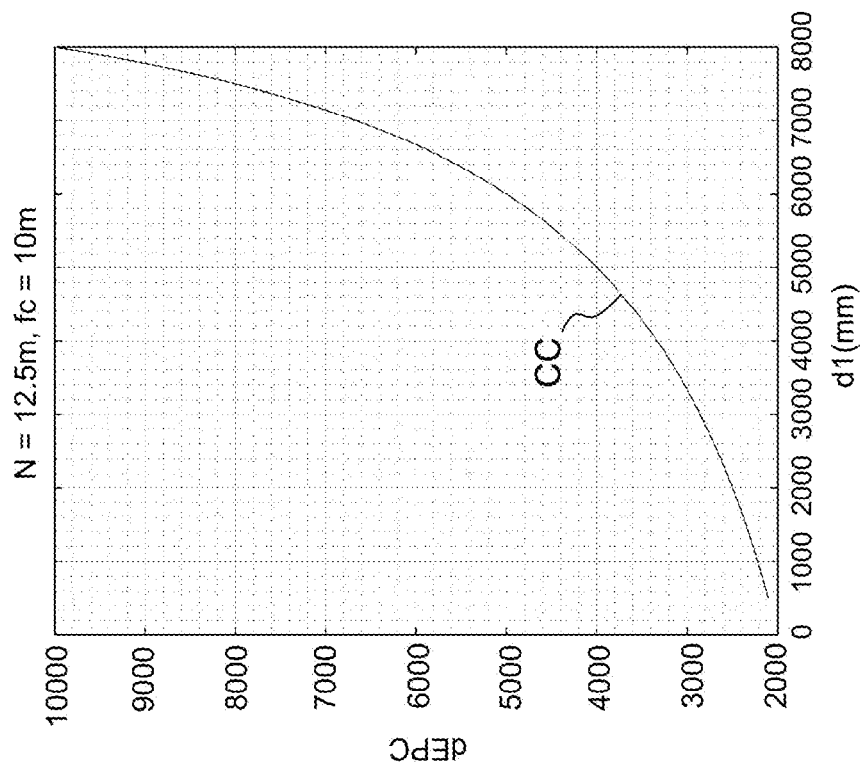
FIG. 13 illustrates the variation in the distance $d_{EPC}$ between the exit pupil of a Cassegrain/Ritchey-Chrétien telescope and the focal plane (image plane, corresponding to the intermediate image plane of the telescope according to the invention) as a function of the distance d1 between M1 and M2.
Figure 12:
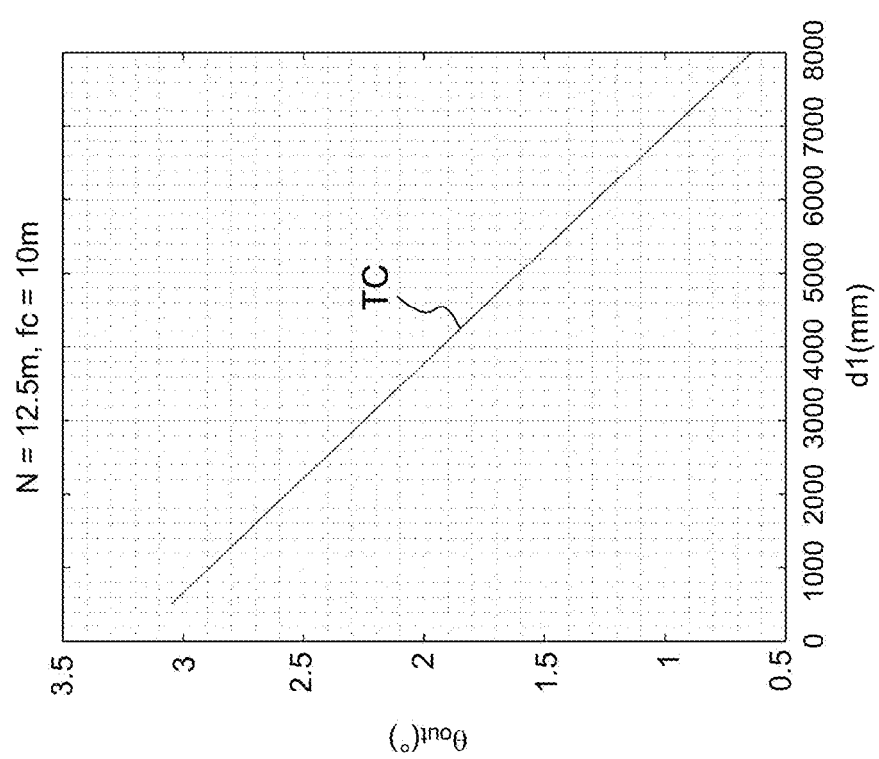
FIG. 12 illustrates the variation in the exit angle as a function of the distance d1 between M1 and M2, for a Cassegrain/Ritchey-Chrétien telescope.

FIG. 12 illustrates the variation (curve TC) in the angle θout as a function of the distance d1, for an initial telescope such as described above. FIG. 13 illustrates the variation in the distance $d_{EPC}$ as a function of d1 (curve CC).

In a Cassegrain telescope, a point that is important to the invention is that the exit pupil PS is virtual and located behind the mirror M2.

Figure 14:
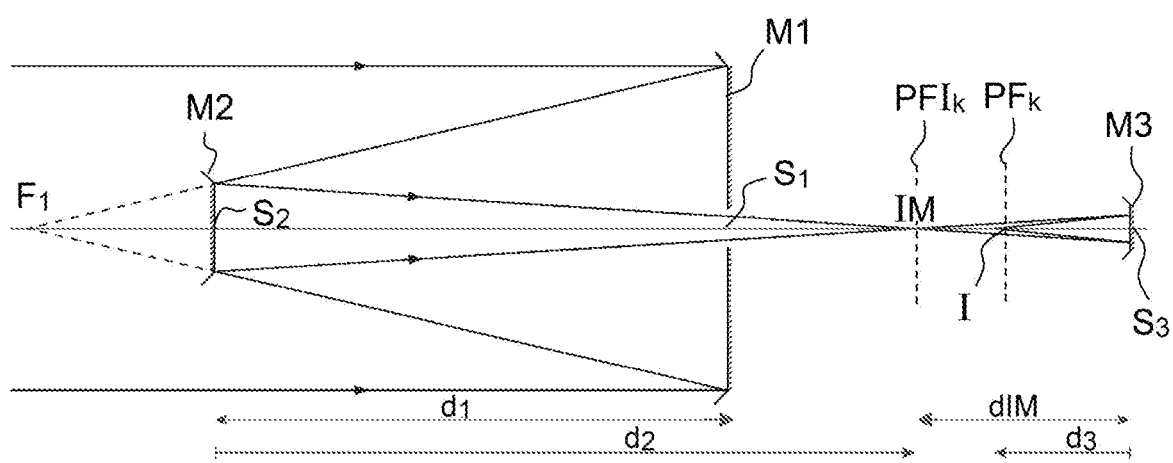
FIG. 14 illustrates the distances and optical parameters of interest in a
Korsch telescope.

FIG. 14 illustrates the various distances and points of interest in a Korsch telescope: the point IM is the point in the intermediate focal plane PFIk on the optical axis, and the point I is the point in the focal plane PFk located on the optical axis, d1 is the distance between M1 and M2 (the arrow gives the sign of this distance), d2 is the distance between M2 and IM, dIM is the distance between IM and the third mirror M3, d3 is the distance between M3 and I, and $d_{EPK}$ is the distance between the exit pupil of the initial telescope and the point I. In a Korsch telescope, the exit pupil is located between M3 and the point I.

The parameters of the Korsch telescope are given by:

$$R_1 = \frac{2d_1 f_K}{f_K + d_2 m_3} \quad R_2 = \frac{2d_2 m_3 R_1}{m_3 R_1 - 2f_K} \quad R_3 = \frac{R_1 R_2}{R_1 - R_2}$$

$$d_{IM} = \frac{1 - m_3}{2m_3} R_3 \quad d_3 = m_3 d_{IM}$$

$$d_{EPK} = d_3 - R_3 \frac{R_2 d_1 - (d_2 + d_{IM})(R_2 + 2d_1)}{2R_2 d_1 - 2(d_2 + d_{IM})(R_2 + 2d_1) - R_3(R_2 + 2d_1)}$$

R1, R2 and R3, the radii of curvature of the mirrors M1, M2 and M3.

The focal length fk is set so that fk=fc=10 m, the distance d2 is set to fk/5, the diameter D of M1 is set to D=0.8 m, and the magnification m3 of M3 is set to—0.95 (a conventional value); the only system variable is the distance d1. Moreover, the aperture N equalling fc/D is equal to 12.5. An equal field is also chosen for both telescopes.

Figure 16:
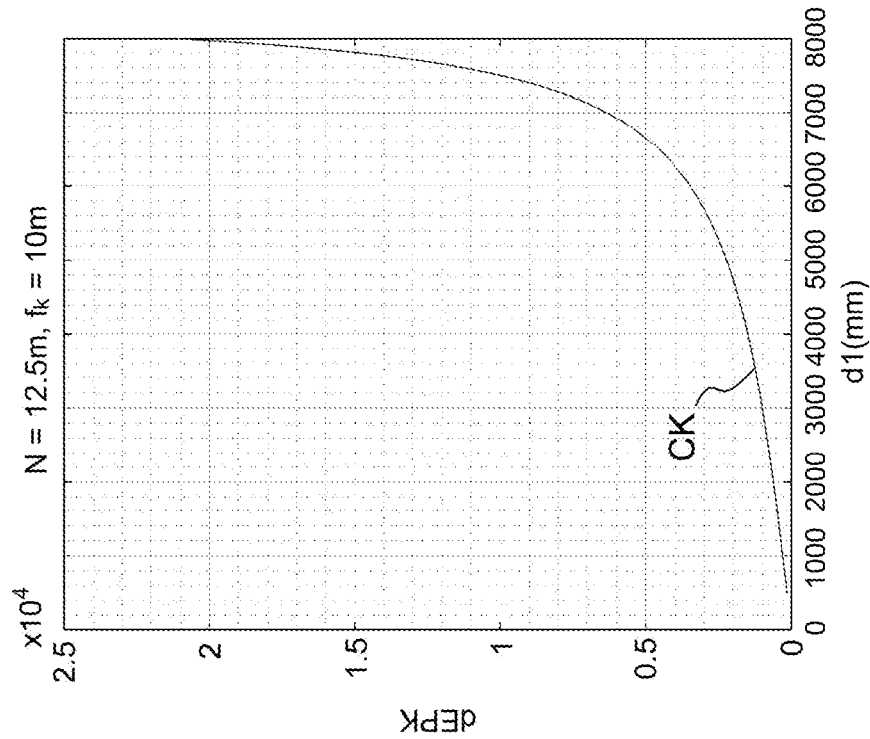
FIG. 16 illustrates the variation in the distance $d_{EPC}$ between the exit pupil of the telescope and the focal plane as a function of the distance d1 between M1 and M2, for a Korsch telescope.
Figure 15:
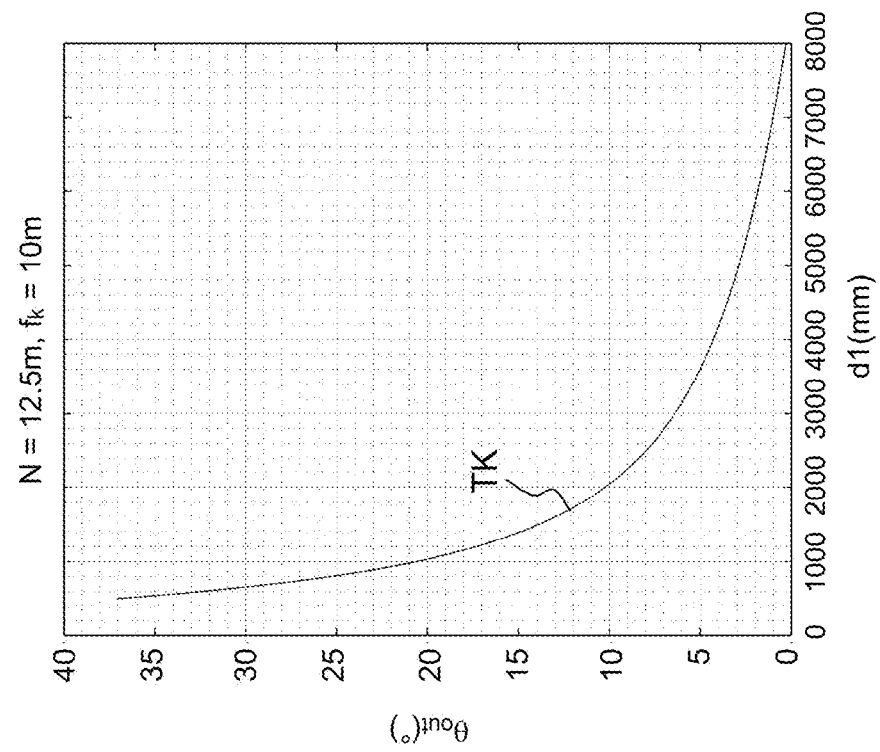
FIG. 15 illustrates the variation in the exit angle as a function of the distance d1 between M1 and M2, for a Korsch telescope.

FIG. 15 illustrates the variation in the angle θout (curve TK) as a function of the distance d1, for fc=fk=10 m and N=12.5 m. FIG. 16 illustrates the variation in the distance $d_{EPC}$ as a function of d1 (curve CK).

In a Korsch telescope, a point that is important to the invention is that the exit pupil PS is real and located behind the mirror M3 and I.

Figure 18:
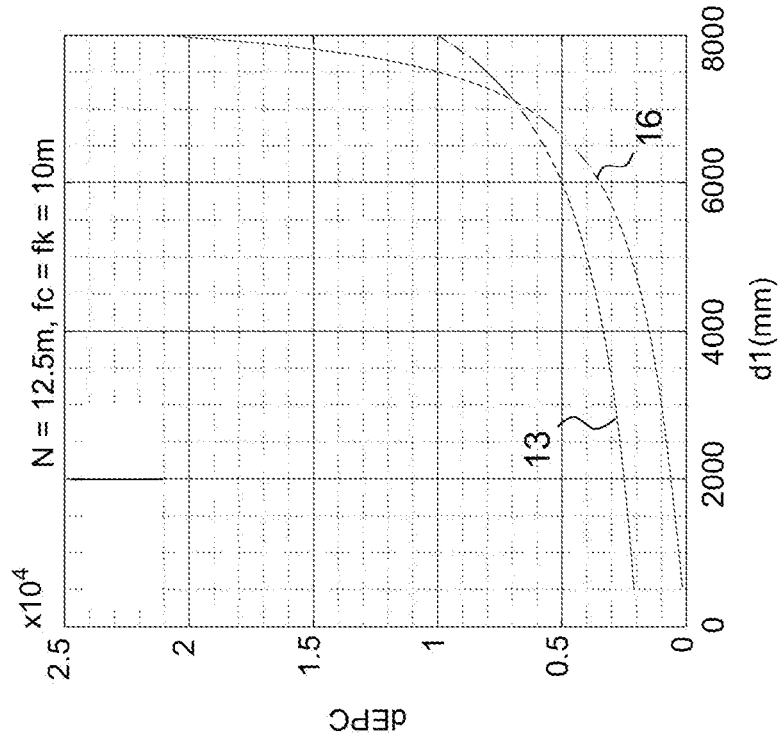
FIG. 18 compares the variation in the distance $d_{EPC}$ as a function of d1 for a Cassegrain telescope and a Korsch telescope.
Figure 17:
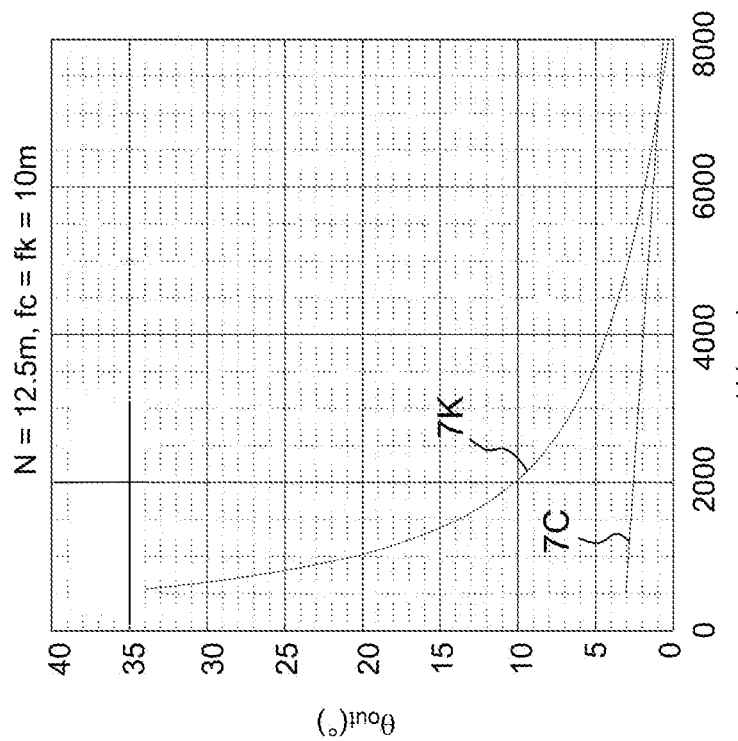
FIG. 17 compares the variation in the largest exit angle as a function of d1 for a Cassegrain telescope and a Korsch telescope.

FIG. 17 compares the curves TC and TK and FIG. 18 compares the curves CC and CK. The two compared telescopes have a focal length, a distance d2, an aperture and a field that are identical. It may be seen that the values of the angle θout obtained with the Cassegrain telescope are much lower than those obtained with the Korsch telescope, at equal d1. The values of θout are directly correlated to the distance $d_{EPC}/d_{EPK}$ between the exit pupil and the focal/image plane: the further the exit pupil from the focal plane, the smaller the angle θout. Specifically, it may be seen in FIG. 18 that, for equal distances d1, the values of $d_{EPC}$ in a Cassegrain telescope are higher than the values of $d_{EPK}$ in a Korsch telescope, up to a distance d1 of 7 m (this distance is never so large in practice). Typically, for a focal length of 10 m and D=0.8 m, a distance d1 smaller than 2 m is chosen.

Comparison of these curves allows the better image quality of the segmented Cassegrain telescope versus the segmented Korsch telescope to be explained: the angles of incidence on the segmenting mirrors are much smaller in the case of the Cassegrain telescope, this minimizing aberrations within the system. Furthermore, this advantage of the Cassegrain telescope allows a final image of much better quality to be obtained, even though in isolation the Cassegrain telescope is much worse than the Korsch telescope.

According to one preferred embodiment, the optimal distance dseg between the intermediate focal plane PFi and the plane P1 in which the mirrors MS1 are placed is obtained via a preset relationship, and is at least dependent on the initial focal length fc of the telescope and on the magnification gs of the segmentation, which is defined by:

$$g_s = \frac{\text{Size along } Y \text{ of the final image}}{\substack{\text{Size along } Y \text{ of the image} \\ \text{in the intermediate focal plane}}}$$

Positioning the mirrors MS1 at an optimal distance dseg allows operation of the segmented telescope 10 according to the invention to be improved, with respect to its opto-mechanical layout (bulk). Preferably, this distance dseg must be respected to within +/−20%, or even +/−10%, i.e. the distance between the intermediate focal plane PFi and the plane P1 must be comprised in a range [dseg−20%, dseg+20%], or even [dseg−10%, dseg+10%].

The value of dseg is dependent, to the first order, on gs and fc, and to the second order on the parameters of the Cassegrain telescope (e.g. distance between mirrors) and on the parameters of the segmenting module (number of mirrors ms1/ms2, dimensions of each of these mirrors, spacing therebetween, etc.). It is also dependent on the entrance field of the initial telescope (field of view), which is typically comprised between 0.5° and 2.5° for Earth-observation applications, and more particularly dependent on the entrance field along the X-axis, which is designated Θx.

Figure 19:
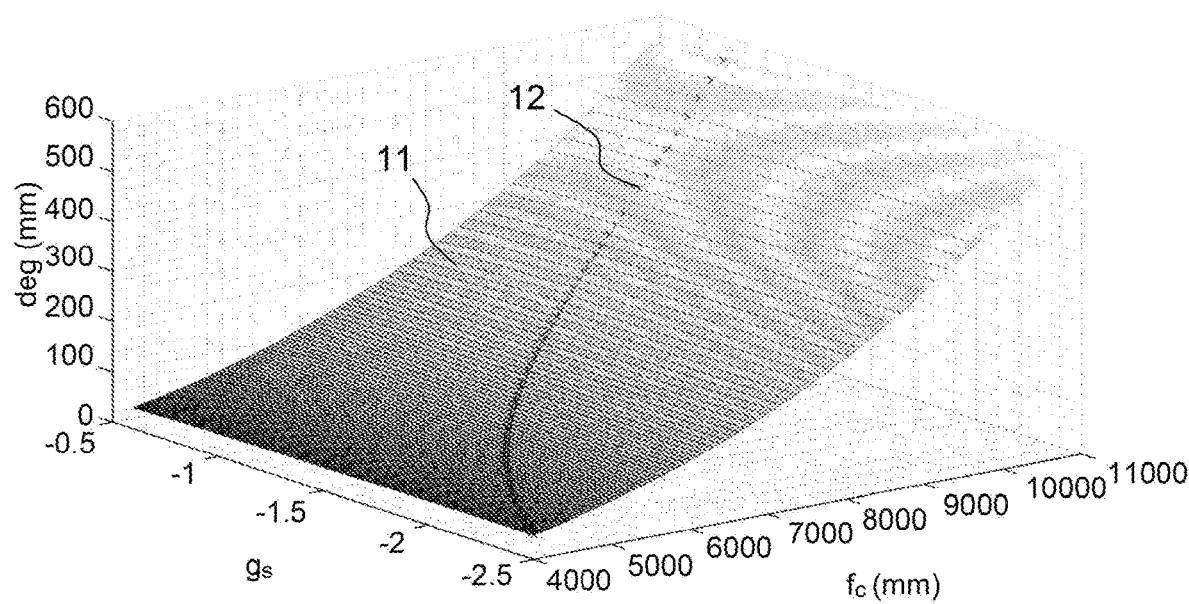
FIG. 19 illustrates the relationship that allows the optimal distance dseg between the intermediate focal plane and the plane of the segmenting mirrors to be determined as a function of the focal length of the initial telescope and of the magnification of the segmenting module.

The relationship allowing dseg to be determined is thus dependent on multiple variables and parameters. FIG. 19 illustrates a three-dimensional graphical representation of this relationship, as a function of fc and gs, for a field of view Θx=1.5° and parameters of the telescope and of the segmenting module along a small bulk to be obtained. The surface 11 represents the various determined dseg values as a function of the pair (fc, gs). The curve 12 illustrates the dseg values for which the focal length F of the segmented telescope is equal to 10 m (F=fc*gs).

The inventors have been able to demonstrate that the value of dseg may be approximated, with an accuracy higher than 5%, by a polynomial interpolation of degree 2 of the type:

$$\text{desg}=A+B*fc+C*gs+D*fc^2+E*fc*gs+F*gs^2$$

Figure 20:
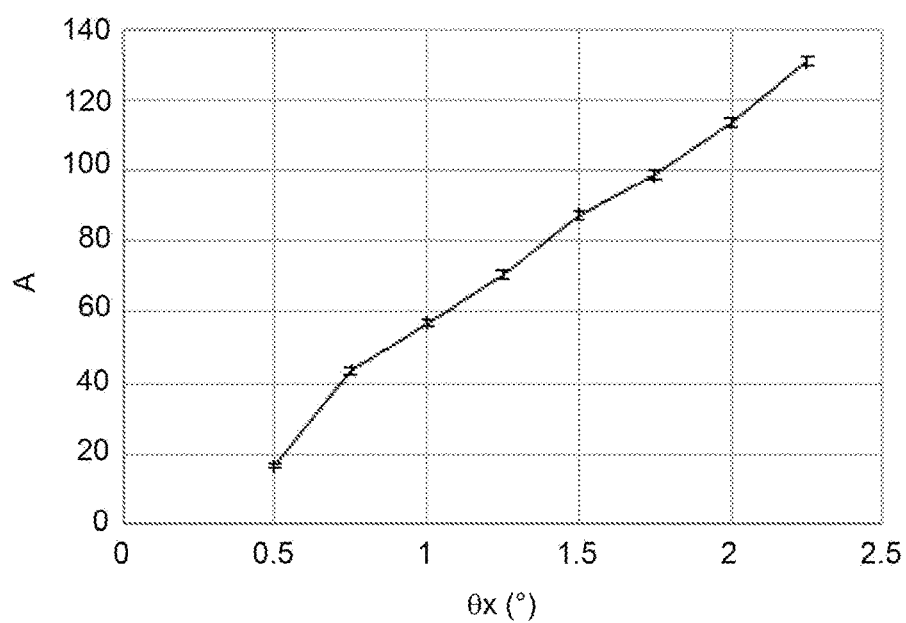
FIG. 20 illustrates the variation in the coefficient A of the interpolation of degree 2 as a function of the entrance field $\Theta x$ along X.
Figure 21:
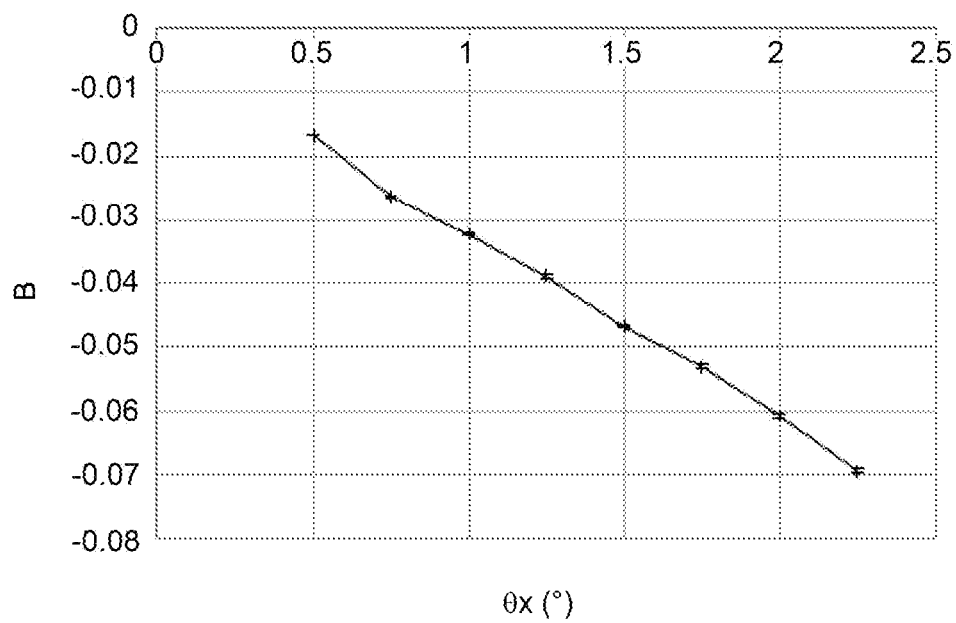
FIG. 21 illustrates the variation in the coefficient B of the interpolation of degree 2 as a function of the entrance field $\Theta x$ along X.
Figure 22:
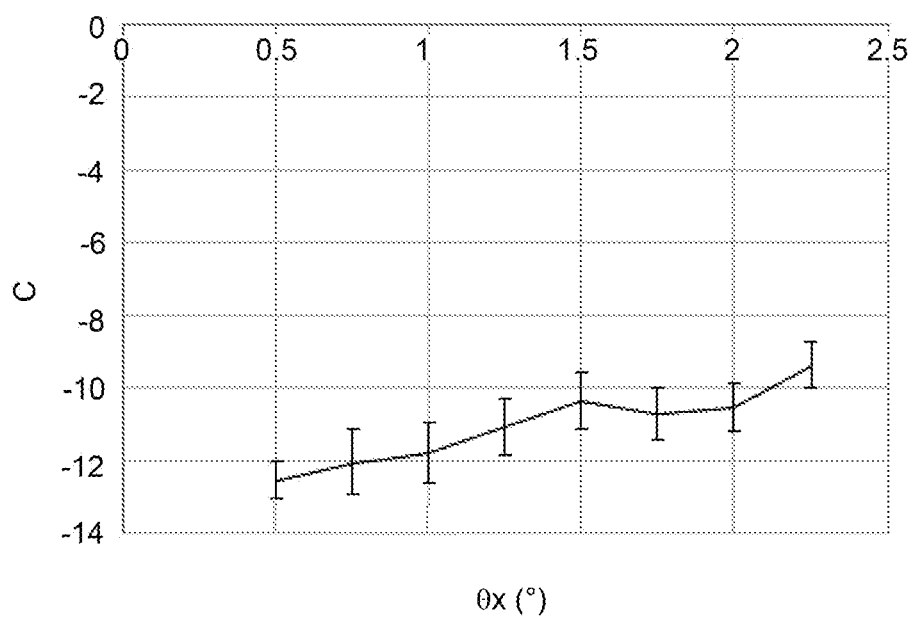
FIG. 22 illustrates the variation in the coefficient C of the interpolation of degree 2 as a function of the entrance field $\Theta x$ along X.
Figure 23:
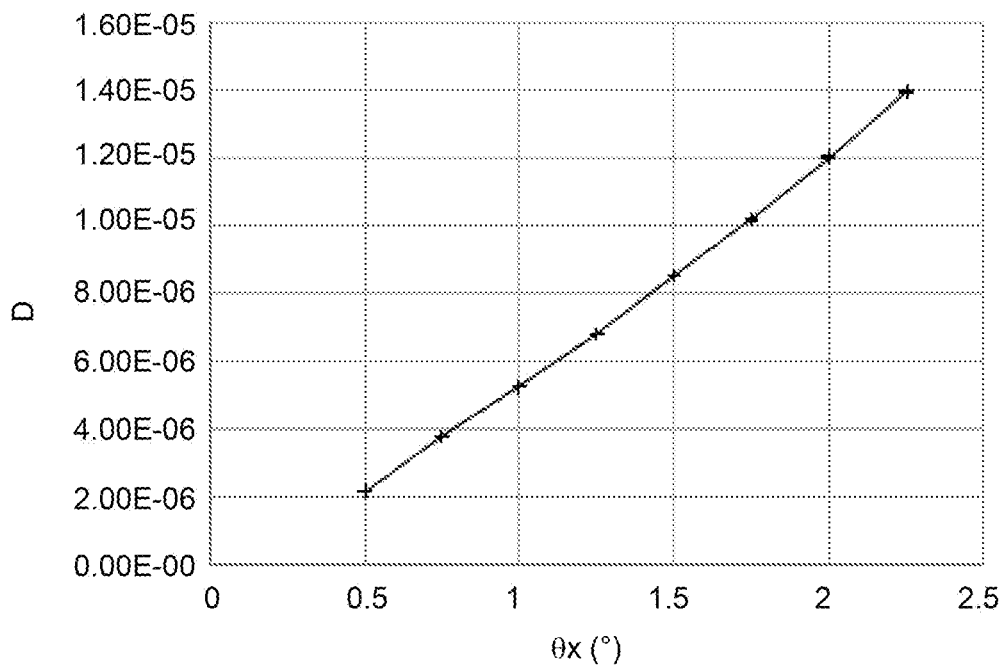
FIG. 23 illustrates the variation in the coefficient D of the interpolation of degree 2 as a function of the entrance field $\Theta x$ along X.
Figure 24:
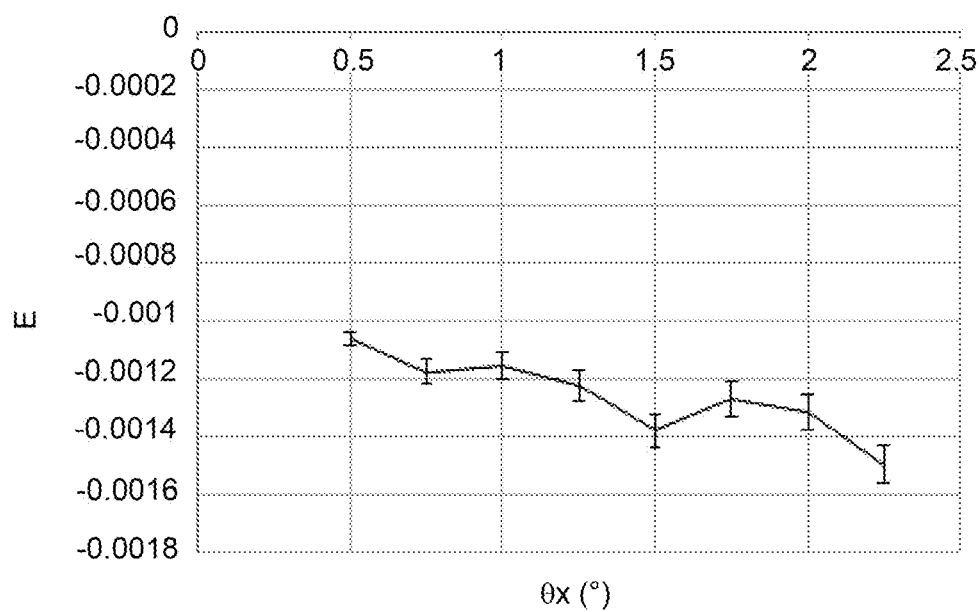
FIG. 24 illustrates the variation in the coefficient E of the interpolation of degree 2 as a function of the entrance field $\Theta x$ along X.
Figure 25:
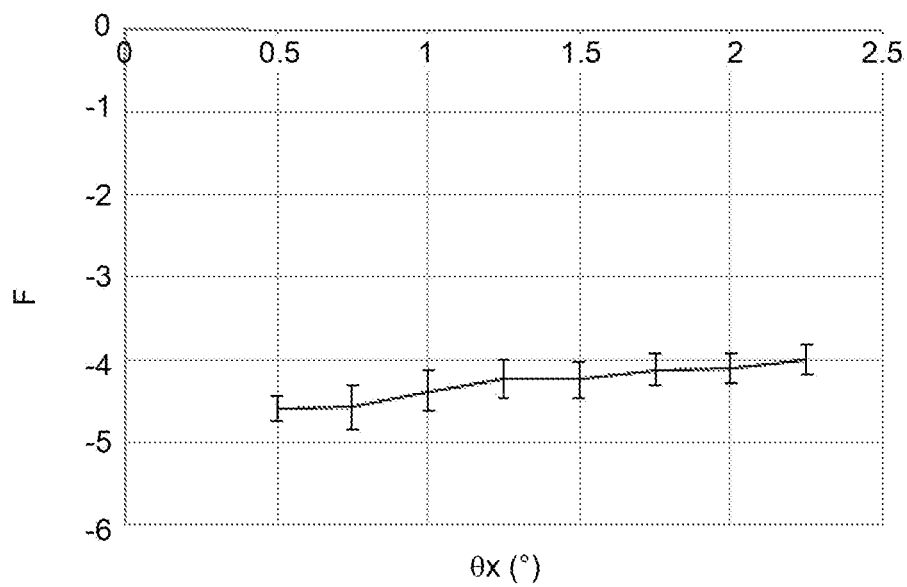
FIG. 25 illustrates the variation in the coefficient F of the interpolation of degree 2 as a function of the entrance field $\Theta x$ along X.

The coefficients A to F are dependent on the entrance field Θx along the X-axis. An example of the variation in these coefficients as a function Θx of is illustrated in FIGS. 20 to 26. FIG. 20 illustrates the variation A(Θx), FIG. 21 B(Θx), FIG. 22 C(Θx), FIG. 23 D(Θx), FIG. 24 E(Θx), and FIG. 25 F(Θx), in the International System of Units.

It will be noted from these curves that, typically, the coefficient A is comprised in the interval [10; 140], the coefficient B in the interval [−0.075; −0.01], the coefficient C in the interval [−14; −8], the coefficient D in the interval [$10^{-6}$; $15 \times 10^{-6}$], the coefficient E in the interval [$-1 \times 610^{-3}$; $-10^{-3}$], and the coefficient F in the interval [−5; −2].

The error bars illustrate the sensitivity of the coefficient to the interpolation. For a coefficient value comprised in the error bar, the interpolation is accurate to more than 95% of the target value.

In the example of FIG. 9, the interpolation error is lower than 3 mm.

Figure 26:
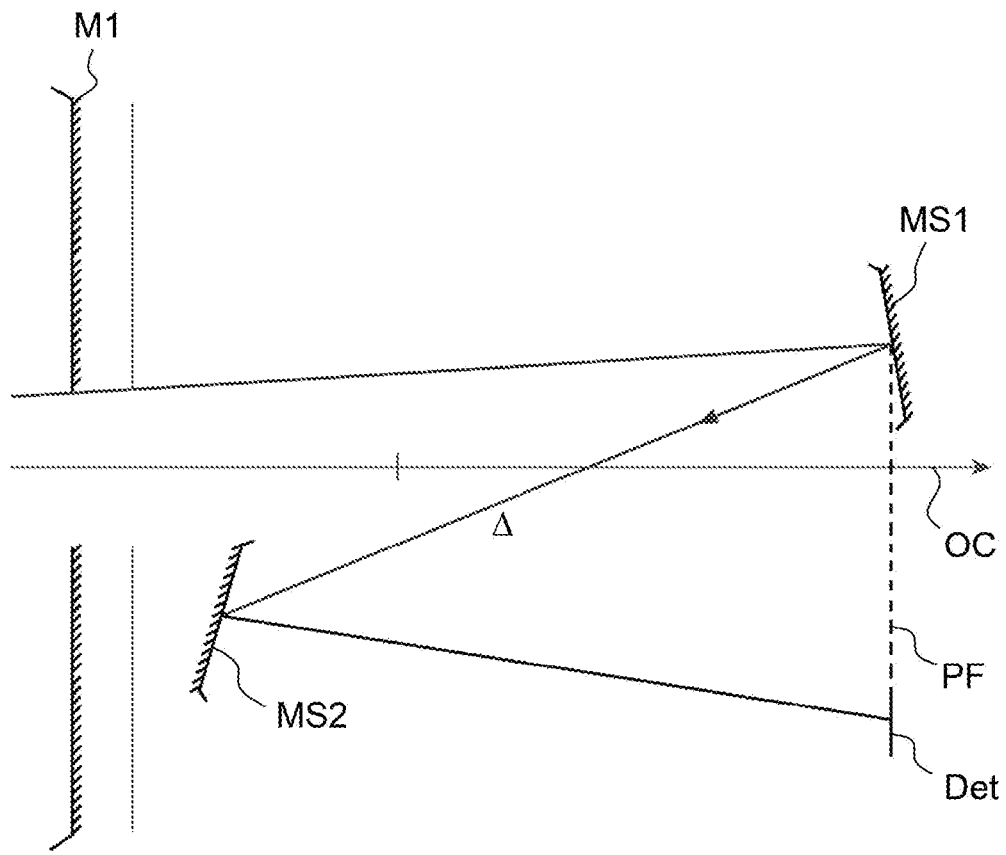
FIG. 26 illustrates an exemplary arrangement, seen from the side, of the segmenting module with respect to the primary mirror M1 of the initial telescope, for a telescope according to the invention.

One preferred mode of arrangement of the segmenting module MSEG with respect to the initial telescope Tel is illustrated in FIG. 26. Once the position of the MS1 has been determined, typically via Formula (1), it is sought to maximize use of the space between MS1 and M1 by positioning the MS2 at a desired distance Δ that is as large as possible, by placing the MS2 as close to M1 as possible. The axis OC is the optical axis of the initial 2-mirror telescope Tel.

The final focal length F of the telescope is dependent on the desired ground sampling distance and the detector is positioned in the plane of the MS1 arbitrarily: this simplifies the calculations, simplifies the mechanics of the telescope and allows the largest MS2-image distance possible while preserving a small bulk (the detector does not "jut out" behind the MS1).

According to a second variant of the invention, the mirrors MS1 of the first set and the mirrors MS2 of the second set are placed in at least two different planes perpendicular to the optical axis. The mirrors of a channel i are configured to have an associated focal length fi, and all the channels are configured to form images in said focal plane PF, the differences in the focal lengths being compensated for by the position of the mirrors MS1 and MS2. Thus, the telescope has a focal length that changes depending on position in the field of view. When the curvature of the Earth is a factor, the advantage of this system is that its ground sampling distance remains the same over a very large field.

The invention claimed is:

1. A telescope comprising:
an initial telescope (Tel) comprising only two mirrors to achieve imaging, a concave first mirror (M1) and a convex second mirror (M2), that are configured so that they form, from a light beam (F0) coming from infinity, an image called an intermediate image (Ii) in a focal plane called an intermediate focal plane (PFi), said intermediate image having a largest dimension along an X-axis perpendicular to an optical axis of the telescope,
a segmenting module (MSEG) comprising:
a first set of n segmenting mirrors (MS1) that are placed downstream of the intermediate focal plane and that are configured to divide the intermediate image obtained from the intermediate focal plane into n sub-images, n being an integer greater than 1,
a second set of n refocusing mirrors (MS2) that are configured to reimage said n sub-images into n images in a focal plane (PF) of the telescope, said images being arranged in said focal plane so as to decrease the dimension along the X-axis containing the n images,
a detecting device (Det) placed in said focal plane (PF).

2. The telescope according to claim 1, wherein the initial telescope is of Ritchey-Chrétien or Cassegrain type.

3. The telescope according to claim 1, wherein the mirrors (MS1) of the first set are placed in a same plane (P1) perpendicular to said optical axis.

4. The telescope according to claim 3, wherein a distance between the intermediate focal plane and said plane (P1) is comprised in a range [dseg−20%, dseg+20%] with dseg a distance determined at least depending on a focal length (fc) of the initial telescope and on a magnification (gs) of the segmenting module, using a preset relationship taking the form of a polynomial interpolation of degree 2 of type:

$$\text{desg}=A+B*fc+C*gs+D*fc^2+E*fc*gs+F*gs^2$$

coefficients A to F being determined depending on an entrance field (Θx) along the X-axis.

5. The telescope according to claim 1, wherein the mirrors (MS1) of the first set and the mirrors (MS2) of the second set are placed in at least two different planes perpendicular to the optical axis, a channel comprising a segmenting mirror and an associated focusing mirror, a channel having an associated focal length, all the channels being configured to form said images in a final focal plane (PF).

\* \* \* \* \*